United States Patent [19]

O'Meara, Jr.

[11] 4,289,621

[45] Sep. 15, 1981

[54] DEVICE FOR TREATING FLUIDS WITH MAGNETIC LINES OF FORCE

[76] Inventor: James R. O'Meara, Jr., 2023 S. Gessner, Ste. N-2, Houston, Tex. 77063

[21] Appl. No.: 151,864

[22] Filed: May 21, 1980

[51] Int. Cl.$^3$ .............................................. B01D 35/06

[52] U.S. Cl. ...................................................... 210/222

[58] Field of Search ............................... 210/222, 223

[56] References Cited

U.S. PATENT DOCUMENTS

| | | | |
|---|---|---|---|
| 2,690,842 | 10/1952 | Spluvak | 210/222 |
| 2,825,464 | 3/1958 | Mack | 210/222 |
| 3,669,274 | 6/1972 | Happ et al. | 210/222 |
| 3,680,705 | 8/1972 | Happ et al. | 210/222 |
| 3,923,660 | 12/1975 | Kottmeier | 210/222 |
| 3,951,807 | 4/1976 | Sanderson | 210/222 |
| 4,050,426 | 9/1979 | Sanderson | 210/222 |
| 4,146,479 | 3/1979 | Brown | 210/222 |
| 4,153,559 | 5/1979 | Sanderson | 210/222 |
| 4,157,963 | 6/1979 | Jessop | 210/222 |
| 4,167,480 | 9/1979 | Mack | 210/222 |
| 4,210,535 | 7/1980 | Risk | 210/222 |
| 4,216,092 | 8/1980 | Shalhoob et al. | 210/222 |

*Primary Examiner*—Theodore A. Granger
*Attorney, Agent, or Firm*—Beveridge, DeGrandi, Kline & Lunsford

[57] ABSTRACT

A device for the treatment of a fluid with magnetic lines of force comprises an elongated non-ferromagnetic outer casing and at least three spaced-apart elongated magnet assemblies positioned therein to form laminar passageways for said fluid. Each magnet assembly comprises at least one tier of at least two permanent magnets encased in non-ferromagnetic jackets and arranged in coaxial line in N—N and S—S relation. The polar ends of the magnets are received in ferromagnetic support members having opposed surfaces to magnetize the support members with the polarity of said polar ends and to distribute the magnetic energy therefrom to the opposed surfaces. The magnet assemblies are positioned so that the polarities of the support members in one of the magnet assemblies are unlike the polarities of the oppositely disposed support members in an adjacent magnet assembly. Means are provided for positioning the magnet assemblies within the outer casing.

11 Claims, 6 Drawing Figures

DEVICE FOR TREATING FLUIDS WITH MAGNETIC LINES OF FORCE

The present invention relates to a device for the treatment of fluids by magnetic lines of force. More particularly, the present invention relates to a device for the magnetic treatment of liquids, and especially aqueous liquids which contain scale minerals, with concentrated high flux intersects to reduce or inhibit the formation of scale in a liquid, especially an aqueous liquid, system.

For many years, devices and/or systems have been proposed which utilize the force fields of permanent magnets for the treatment of liquids and particularly aqueous liquids to reduce or eliminate the precipitation of calcium salts, magnesium salts and other mineral compounds therefrom and the adherence of the resulting precipitate as scale on heat transfer surfaces in boilers, heat exchangers and the like. Many attempts have been made to propose theories explaining the effect of the magnetic phenomena on these and other impurities contained in an aqueous liquid or other fluid. However, conclusive scientific evidence regarding the effect of the phenomena is minimal. It has been theorized that the effect of the magnetic field in reducing the formation of scale appears to be related to the onset of bulk crystallization of scale minerals upon a large number of microscopic nucleating centers that are formed when a fluid such as an aqueous liquid containing moderate or supersaturated proportions of scale salts flows through a magnetic field.

Even in the absence of conclusive evidence and explanation, numerous devices have been proposed in the recent past for the purpose of treating water and other liquids in order to reduce and in some cases eliminate the need for added chemical dispersants and/or coagulants. These devices have had varying degrees of success depending on their design and/or the understanding of the designer of magnetic principles and applications. Generally, the magnetic treatment of an aqueous liquid results in causing the materials that ordinarily form scale contained therein to form, instead, a loose slurry or sludge-like substance which can be easily removed from the aqueous liquid system by simple blowdown or flushing.

The devices proposed to date are generally either of a complicated nature and expensive to fabricate or are of minimal effect in reducing the formation of scale.

It is therefore a primary object of the present invention to provide an improved device for the treatment of fluids with magnetic lines of force which is relatively simple and economical in construction, and is of desirably high efficiency.

It is another object of the present invention to provide such a device which creates concentrated high flux intersects to reduce or eliminate scale-forming compounds from liquids containing them.

Broadly, the device for the treatment of fluids with magnetic lines of force in accordance with the present invention utilizes a non-ferromagnetic outer casing to magnetically isolate magnet assemblies disposed therein so that lines of magnetic force are concentrated to achieve maximum force fields at selected points. There are two distinct magnetic force fields generated by the device of the present invention. The minor force is radial and is inherent in elongated and particularly in cylindrical magnets, i.e., a N/S attraction for each individual magnet. The primary magnetic force fields of the device of the present invention are generated by the parallel and spaced apart magnet supports positioned throughout the device. There are generated numerous high flux lines of magnetic force throughout the device which are concentrated at force field contraction points to intersect the aqueous liquid or other fluid flowing therethrough. Preferably, the aqueous liquid or other fluid passes through the device in substantially laminar sheets whereby it intersects these primary high flux lines of magnetic force or force field contraction points at substantially right angles. The device of the present invention provides adjacent high flux lines of magnetic force or force field contraction points of unlike or reversed polarity whereby said contraction points present reversed magnetic lines of force between adjacent magnet sections of the device. This results in dipole realignment which causes added excitation of the microscopic nucleating centers within the fluid resulting in the attraction and alignment of like compounds and, when the fluid is a liquid, reduces their solubility therein. These induced energy characteristics within a supersaturated solution stimulate the microscopic nucleating centers therein and attract like compounds, thus altering their energy potential. The resulting charged and coagulated impurities remain in the flowing stream and (depending on the increase in temperature) refuse to adhere to any surface contacted by the stream. Multiple excitation and molecular realignment points are provided to accelerate the nucleating process. It has been found, in addition, that use of the device of the present invention tends to reduce or eliminate scale earlier deposited on surfaces contacted by the treated stream of fluid.

The present invention is further illustrated with reference to the annexed drawing wherein.

Figure 1:
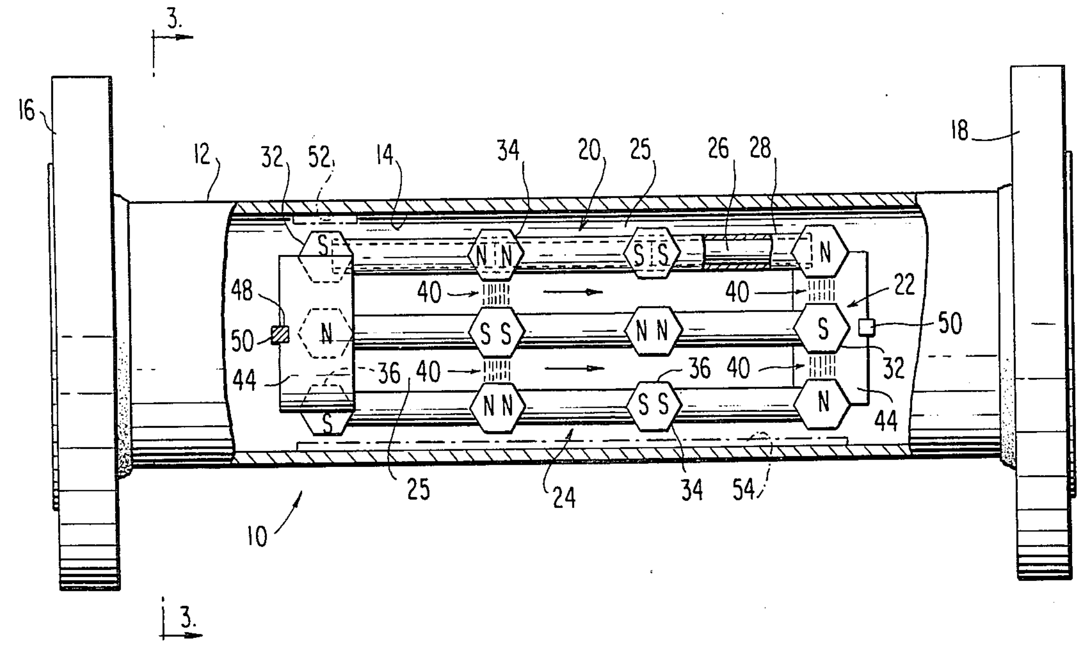
FIG. 1 is a top view of a fluid treatment device in accordance with the present invention showing the outer casing sectioned in part so as to expose the inner structure thereof.

Referring to the drawing, the fluid treating device 10 comprises a non-ferromagnetic elongated hollow outer casing 12 made of 300 series stainless steel or other non-ferromagnetic metallic or polymeric material and having an inner surface 14. Casing 12 is terminated at both ends thereof by flanged end fittings 16 and 18 which define inlet and outlet openings for the entrance of fluid to be treated into device 10 and the exit of treated fluid therefrom. It is to be understood that flanged end fittings 16 and 18 are illustrative only and may be replaced by equivalent end fittings such as threaded end fittings, dresser couplings or the like which will provide a fluid tight seal with a conduit (not shown) which serves to feed fluid to be treated to device 10 and carry treated fluid therefrom.

Within casing 12 are positioned three spaced-apart magnet assemblies, generally 20, 22 and 24, each being coextensive in length and having a longitudinal axis substantially parallel with the longitudinal axis of casing 12 and with one another to define parallel substantially laminar fluid passageways 25 therebetween. Each magnet assembly contains a plurality of permanent magnets 26 which are formed from a material having high flux density and high retentivity, for example, barium titanate, a ferrite compound such as barium ferrite, an alnico and the like, and magnetized along a given path therein as is well known in the art. In the embodiments shown in the drawing, each magnet 26 is cylindrical and is magnetized along its longitudinal axis. Magnet 26 is encased in non-ferromagnetic jacket 28 which may be formed of a non-ferromagnetic material, i.e., a metal such as brass or copper or the like or a polymeric material, such as rigid polyvinyl chloride, which is hard and wear-resistant or the like.

Each magnet assembly comprises at least one tier 29 of at least two magnets 26 encased in jackets 28 and arranged in a coaxial line with the magnets in the same tier having like poles adjacent to each other, i.e., in N—N and S—S relationship. The polarity at one end of each tier of magnets and, therefore, of each magnet assembly 20, 22 and 24, may be either like or unlike the polarity at the other end thereof, depending on whether there is an odd or even number of at least two magnets 26 in each tier 29. In the embodiment shown in FIGS. 2 and 3, magnet assemblies 20 and 24 each contain four tiers of magnets 26 and jackets 28 and magnet assembly 22 contains five tiers thereof. In the embodiment shown in FIG. 6, magnet assemblies 20 and 24 each contain two tiers of magnets 26 and jackets 28 and magnet assembly 22 contains four tiers thereof.

The polar ends of magnets 26 are supported in inlet and outlet end support members 32 and internal support members 34 formed of a ferromagnetic material such as cold steel, wrought iron or the like, which are magnetized by said magnets. Support members 32 and 34 are shown in the drawing as being hexagonal in cross-section although any other shape may be used, i.e., the members may be substantially cylindrical, rectangular, square, etc. in cross-section. Preferably, the surfaces 36 of end support members 32 and the facing surfaces 36 of the oppositely disposed end support members 32 of an adjacent magnet assembly are planar and substantially parallel to one another. In a further embodiment, surfaces 36 of all of support members 32 and 34 have this configuration. It is to be understood, however, that any one surface 36 may be either planar or non-planar irrespective of whether the facing surface 36 of an oppositely disposed support member is planar or non-planar.

When magnets 26 are of the preferred cylindrical shape shown in the drawing, each magnet assembly will contain a plurality of tiers 29 arranged one above another to form at least two columns 30 of individual magnets 26 encased in jackets 28 and supported in support members 32 or 34. However, it is possible although not preferred to replace a column 30 of magnets 26 by a single magnet (not shown) substantially in the shape of a plate also encased in a non-ferromagnetic jacket and held in support members 32 or 34.

The number of tiers 29 of magnets 26 in each of magnet assemblies 20, 22 and 24 and the number of magnet assemblies in a device 10 will be dependent, inter alia, on the shape and dimension of the magnets 26 and support members 32 and 34, and the inner diameter of outer casing 12. The number of columns 30 of magnets 26 in each of magnet assemblies 20, 22 and 24 will be dependent, inter alia, upon the identity of the fluid being treated, the concentration or impurities contained in the fluid, and the physical characteristics of the fluid, e.g., viscosity, dielectric constant, etc. The magnet assemblies in the embodiment shown in FIGS. 2 and 3, for example, can be received in an outer casing 12 having an internal diameter of about three inches or more. The magnet assemblies in the embodiment shown in FIG. 6 can be received in outer casings 12 having internal diameters of about two inches. It is within the scope of the present invention to provide outer casings 12 having diameters of up to about twenty-four inches or more. For example, an outer casing 12 having an inner diameter of about ten inches may contain up to about 246 magnets arranged, for example, in tiers of two or more magnets each and in columns arranged in up to 8 magnet assemblies, while an outer casing 12 having an inner diameter of twenty-four inches may contain about 1191 magnets 26 arranged, for example, in tiers of two or more magnets each and in columns arranged in up to 17 magnet assemblies.

Figure 2:
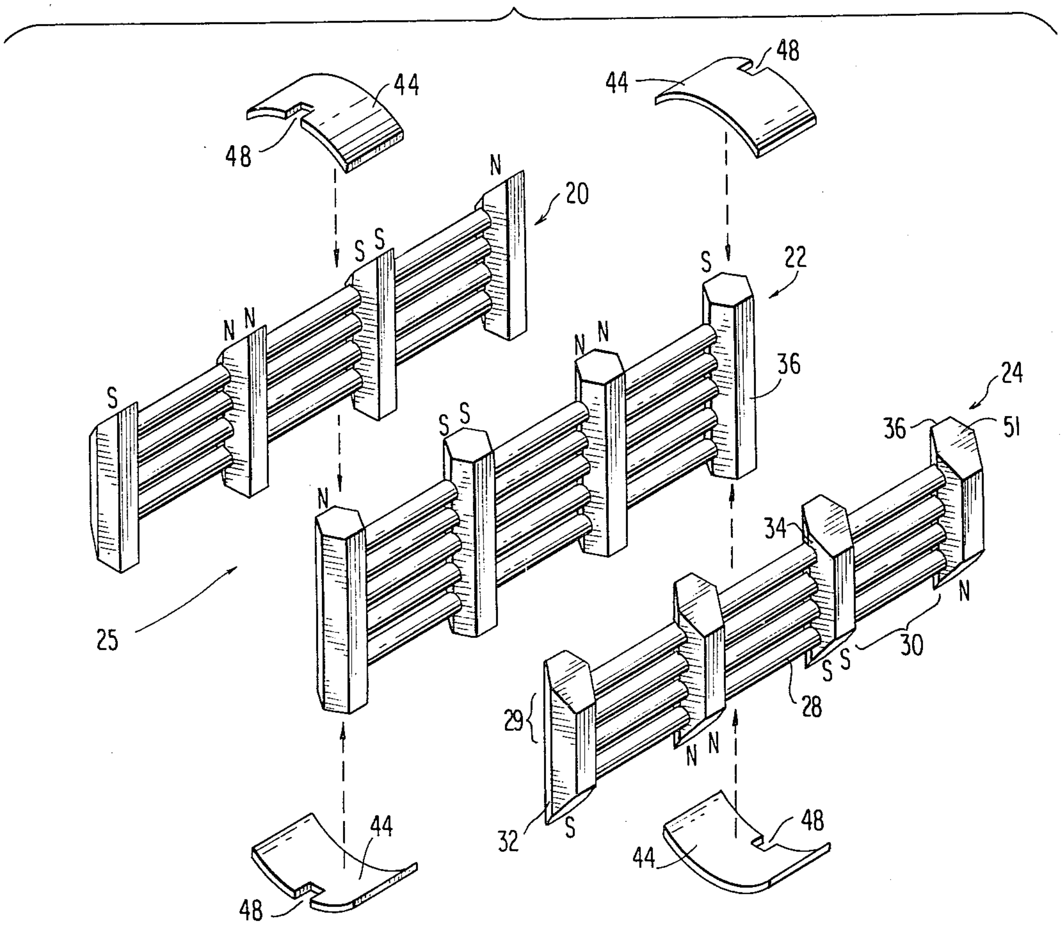
FIG. 2 is a perspective and exploded view of the inner structure of the device of FIG. 1 illustrating the structure and arrangement of the magnet assemblies therein.

Each end support member 32 is counter-bored to receive and support the polar end of a single magnet 26 and jacket 28 or a single column 30 thereof and, in the embodiment shown in FIGS. 1 and 2, the internal support members 34 are through-bored to receive and support abutting or contiguous like poles of adjacent magnets 26 in jackets 28. As a result, the support members 32 and 34 are magnetized with the polarity of the polar ends of magnets 26 received therein and the magnetic energy is distributed to said surfaces 36. This further results in a concentration of the lines of magnetic force at said surfaces 36 which become force field contraction points to achieve maximum force fields 40 between oppositely disposed support members 32 and 34 of adjacent magnet assemblies. It is to be understood that other equivalent means may be used to adapt support members 22 and 24 to receive magnets 26 and jackets 28 therein so long as the polar ends of magnets 26 are in efficient magnetic field termination with said support members, e.g. routing of the support members, ground jointing of the magnets with the support members, etc. Other preferred means to achieve efficient magnetic field termination are more fully discussed hereinafter.

Figure 4:
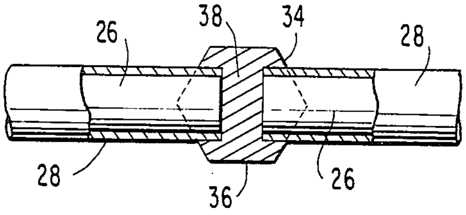
FIGS. 4 and 5 are enlarged fragmentary cross-sectional views of modified arrangements of the magnets within their jackets and support members.
Figure 5:
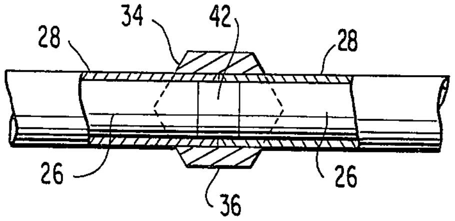

In the embodiment shown in FIG. 1, the magnets 26 in each tier 29 are contiguous and encased in a unitary coextensive jacket 28. In the embodiment shown in FIG. 4, magnets 26 and jackets 28 are terminated with like magnet poles of magnets 26 received in opposed counter-bores in an internal support member 34 leaving portion 38 of internal support member 34 lying between and contiguous with the polar ends of magnets 26. The arrangement shown in FIG. 4 results in the most effective manner for uniformly distributing magnetic energy, i.e. magnetic lines of force, from the polar ends of magnets 26 to the surfaces 36 of support members 34. In the further embodiment shown in FIG. 5, support member 34 is through-bored and receives jacket 28 within which like magnet polar ends of magnets 26 are separated by a contiguous spacer 42 formed of a ferromagnetic material such as cold steel, wrought iron, etc. Spacer 42 also serves to uniformly distribute the magnetic energy from the polar ends of magnets 26 at surfaces 36 as described above. Any of these three arrangements of polar ends of magnets 26 and jackets 28 within internal support members 34 may be utilized in the device of the present invention as may other arrangements as discussed above which are effective in uniformly distributing magnetic energy from magnets 26 to surfaces 36.

The magnet assemblies 20, 22 and 24 are assembled and positioned within outer casing 12 so that the polarity of each support member 32 and 34 in any one of said magnet assemblies is unlike the polarity of the oppositely disposed support member 32 or 34 in an adjacent magnet assembly. This is shown most clearly in FIGS. 1 and 2 wherein it is shown that the polarity of any given support member 32 or 34 in magnet assembly 20 is unlike the polarity of the oppositely disposed support member 32 or 34 in magnet assembly 22, the same relationship existing between the support members of magnet assembly 22 and the oppositely disposed support members in magnet assembly 24.

Figure 3:
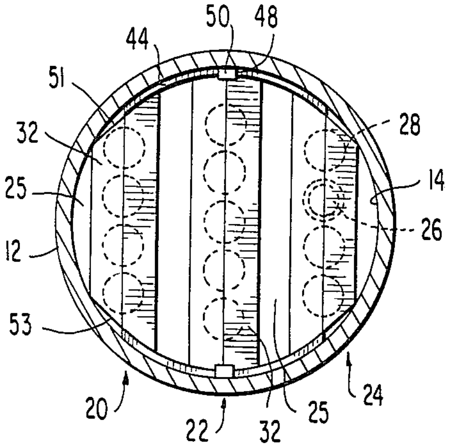
FIG. 3 is a cross-sectional view taken along line 3—3 of FIG. 1 and viewed in the direction of the arrows.

Means are provided for magnetically isolating magnet assemblies 20, 22 and 24, from one another. As seen in FIGS. 1 and 3, separating plate 44 which is formed of a non-ferromagnetic metal such as copper, brass, 300 series stainless steel and the like, or other non-ferromagnetic material of sufficient strength, is fixedly attached to oppositely disposed support members 32 of magnet assemblies 20, 22 and 24 whereby said support members and magnet assemblies are spaced apart. The attachment may be achieved by brazing or the like. While FIGS. 1 and 3 show plates 44 attaching only one set or only one end of end support members 32, it is to be understood that plates 44 will also be provided in like manner for both ends of both sets of end support members 32 as seen in FIG. 2. If desired, internal support members 34 may also carry plates 44 in the same or a similar manner.

As seen in FIG. 3, separating plate 44 is contiguous with inner surface 14 of outer casing 12 and may be attached thereto by any means known to the art. Alternatively, plate 44 may be spaced from outer casing 12.

Other means may also provide for fixedly positioning the magnet assemblies 20, 22 and 24, spaced apart by separating plates 44, within outer casing 12. As seen in FIGS. 1 and 3, separating plate 44 is provided with notch 48 and outer casing 12 is provided with a retaining plug 50 fixedly attached to the inner surface 14 thereof and which cooperates with notch 48 to restrict all movement of magnet assemblies 20, 22 and 24 within outer casing 12 and maintain their position therein. The number and spacing of notches 48 and retaining plugs 50 may be varied according to the size and number of magnet assemblies disposed within the outer casing. In the embodiment shown in FIGS. 1, 2 and 3, magnet assemblies 20 and 24 are spaced within outer casing 12 such that passageways 25 are provided therebetween for passage of fluid being treated therethrough. Although the flow of fluid is shown by arrows to go from left to right in FIGS. 1 and 2, it is to be understood that said flow may be from right to left if desired.

Figure 6:
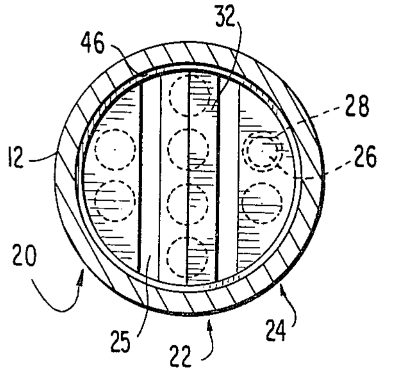
FIG. 6 is a cross-sectional view similar to FIG. 3 illustrating a modified inner structure of the device of FIG. 1.

As seen particularly in FIGS. 3 and 6, support members 32 and 34 of magnet assemblies 20 and 24 are adapted to fit within the curvature of outer casing 12. In the embodiment shown in FIG. 3, end support members 32 of magnet assemblies 20 and 24 are truncated to form tapered surfaces 51 and 53. In the embodiment shown in FIG. 6, support members 32 of magnet assemblies 20 and 24 are curved to conform to the inner surface of outer casing 12 to allow maximum liquid flow through passageways 25. In this embodiment also, support members 32 of magnet assemblies 20, 22 and 24 are fixedly attached to the inner surface of separating ring 46 which is contiguous with the inner surface of outer casing 12. Ring 46 may be attached to outer casing 12 as discussed above with regard to plate 44 in FIGS. 1 and 3. Ring 46 may also be replaced by plates 44 if desired.

In an optional further embodiment of the device, as shown by broken lines in FIGS. 1 and 3, there may be provided a series of plates 52 formed of ferromagnetic material such as cold steel and the like welded or otherwise fixedly attached to the inner surface 14 of outer casing 12 to establish a force field which will traverse passageways 25 between opposite surfaces 36 of magnet assemblies 20 and 24 and said plates 52 on outer casing 12. Alternatively, there may be provided elongated plate 54 for the same purpose. Preferably, the surfaces 36 opposite to said plates 52 or 54 are planar and substantially parallel to said plates and to inner surface 14 of outer casing 12.

The spacing between magnet assemblies 20, 22 and 24 and, where applicable, between each of magnet assemblies 20 and 24 and outer casing 12 may be varied within certain criteria. It is important that the opposing surfaces 36 of adjacent magnet assemblies be sufficiently close that the force fields therebetween remain effective for the intended purpose and that the fluid passing through passageways 25 be sufficiently confined. It is also important, however, that sufficient flow of fluid through the device be maintained to prevent too high or severe a pressure drop.

Optionally and preferably, the magnet assemblies 20, 22 and 24 are assembled with plates 44 and this assembled magnet unit is treated to minimize or eliminate the effect of galvanic corrosion which might normally occur between dissimilar metals. This may be accomplished, for example, by spraying or dipping the assembled unit in a coating material such as zinc, an epoxy resin, an elastomer or any other suitable material. Following this, the assembled unit is installed in outer casing 12 and retaining plug 50 are inserted and the unit again treated as described above as a completed device 10 to cover any imperfections which may occur during installation, for esthetic reasons or for adapting the device for use with a particular fluid.

In operation, fluid to be treated is supplied to device 10 through a conduit, not shown. The fluid enters outer casing 12 and, when the fluid contacts device 10, it is directed into passageways 25, thus altering the flow path of the fluid and promoting molecular alignment of compounds contained therein. As the resulting laminar sheets of fluid traverse concentrated high flux intersects or force fields 40 of alternating N-S and S-N lines of magnetic force at substantially right angles, the microscopic nucleating centers are excited. This results in attraction and alignment of like compounds contained in the fluid and the formation of coagulated impurities which remain in the flowing stream. Device 10 is preferably contained in a closed system with a boiler, heat exchanger or the like. As the fluid makes repeated passes through device 10, the amount of coagulated impurities will increase and may be removed from the system at any desired time.

While the device of the present invention is especially suited for fluids such as calcareous aqueous liquids, the device may be modified for use with other liquids or with gases in related fields including hyperfiltration of effluents, oil and gas well drilling applications, crude oil collection systems, etc.

In the foregoing description and throughout the specification and claims, "ferromagnetic" is used to describe materials with a high magnetic permeability and saturation point and which are attracted to a magnet, i.e. such materials as iron, nickel, cobalt, etc. By way of unlimiting example, in a recent test with a device constructed as in FIGS. 1 and 2, but omitting plates 52 and 54, ordinary tap water having dissolved calcareous components was passed through the device in an existing scaled system in south Texas. The ordinary tap water was magnetically treated to reduce the solubility of the scale forming components therein, and thus when circulating through the closed system prevented the deposit of new scale formations on metal surfaces. In addition to the above, it was noted that existing scale in the system was reduced and put into solution. This important descaling feature was shown to be substantial by inspection and the frequency of blowdowns. It was projected that all or a substantial majority of the scale in the system will be removed in about 60 days of operation.

What is claimed is:

1. A device for the treatment of fluids with magnetic lines of force comprising:

an elongated hollow non-ferromagnetic outer casing having a longitudinal axis and fluid inlet and outlet means at the longitudinal ends thereof;

at least three spaced-apart and longitudinally coextensive elongated magnet assemblies, each positioned within said outer casing and having a longitudinal axis substantially parallel with that of adjacent magnet assemblies and with the longitudinal axis of said outer casing to form elongated laminar passageways for said fluid therebetween;

each of said magnet assemblies comprising at least one tier of at least two permanent magnets, each magnet being encased in a non-ferromagnetic jacket and arranged in a coaxial line with the other magnet or magnets in the same tier with like poles of said magnets adjacent each other;

said non-ferromagnetic jacket having its ends supported by ferromagnetic support members and the length of each tier of jacketed magnets being supported between its ends by at least one ferromagnetic support member adjacent the ends of the jacketed magnets received therein, to magnetize said support members with the polarity of the magnet ends supported thereby;

said magnet assemblies being positioned so that the polarities of the support members in one of said magnet assemblies are unlike the polarities of the oppositely disposed support members in an adjacent magnet assembly; and means for fixedly positioning said magnet assemblies within said outer casing.

2. The device according to claim 1 wherein each of said tiers contains at least three permanent magnets.

3. The device according to claim 1 wherein said support members comprise end support members and at least one internal support member in each of said magnet assemblies.

4. The device according to claim 3 wherein said internal support member is adapted to receive and support abutting like poles of adjacent magnets encased in a non-ferromagnetic jacket.

5. The device according to claim 3 wherein said internal support member is adapted to receive and support like poles of adjacent magnets each encased in a non-ferromagnetic jacket with a portion of said internal support member lying between and contiguous with the polar ends of said magnets and said jackets.

6. The device according to claim 3 wherein said internal support member is adapted to receive and support like poles of adjacent magnets each encased in a non-ferromagnetic jacket with a ferromagnetic spacer positioned between and contiguous with the polar ends of said magnets.

7. The device according to claim 3 wherein the surfaces of said end support members in one of said magnet assemblies and the oppositely disposed surfaces of the end support members in an adjacent magnet assembly are planar and substantially parallel with one another and with the longitudinal axis of said magnet assembly.

8. The device according to claim 1 wherein the surfaces of all support members in said magnet assemblies which are oppositely disposed to surfaces of the support members in an adjacent magnet assembly are planar and substantially parallel with one another and with the longitudinal axis of said magnet assembly.

9. The device according to claims 1 or 8 wherein plates formed of ferromagnetic material are fixedly attached to the inner surface of the outer casing and are disposed opposite to surfaces of the support members in the adjacent magnet assemblies.

10. The device according to claim 9 wherein said surfaces of said support members are planar and substantially parallel with the surfaces of said plates and of said outer casing.

11. The device according to claim 1 wherein said permanent magnets are cylindrical in shape.

* * * * *